United States Patent [19]

Malinowski

[11] 4,099,065

[45] Jul. 4, 1978

[54] SMOKE DETECTOR WITH CHAMBER FOR PRODUCING EDDY CURRENTS

[75] Inventor: William J. Malinowski, Pembroke, Mass.

[73] Assignee: Chloride, Incorporated, Tampa, Fla.

[21] Appl. No.: 731,626

[22] Filed: Oct. 12, 1976

[51] Int. Cl.$^2$ .......... G01N 21/26

[52] U.S. Cl. .......... 250/574; 356/207

[58] Field of Search .......... 250/573, 574; 340/237; 356/206, 207, 208

[56] References Cited

U.S. PATENT DOCUMENTS

| | | | |
|---|---|---|---|
| 3,313,946 | 4/1967 | Goodwin et al. | 340/237 S |
| 3,383,670 | 5/1968 | Roberts | 340/237 S |
| 3,430,220 | 2/1969 | Deuth | 250/574 |
| 3,659,278 | 4/1972 | Jensen | 340/237 S |
| 3,916,209 | 10/1975 | Steele et al. | 250/574 |

*Primary Examiner*—David C. Nelms
*Attorney, Agent, or Firm*—Robert E. Ross

[57] ABSTRACT

A smoke detector operating on the reflected light principle, in which the detector housing components are designed to provide recesses in which the light and photo-cell assemblies are retained, with a slot disposed between the light and photo-cell recesses through which ambient air is drawn into a chamber illuminated by the light source and viewed by the photo-cell. When smoke is present in the incoming ambient air, it diffuses throughout the chamber to provide a large volume of illuminated smoke for viewing by the photo-cell thereby giving a fast response to the presence of a small concentration of smoke in the ambient air.

The provision of the smoke inlet slot between the light and photo-cell recesses also prevents the accumulation of dust and lint therebetween which could cause a false alarm.

3 Claims, 3 Drawing Figures

SMOKE DETECTOR WITH CHAMBER FOR PRODUCING EDDY CURRENTS

BACKGROUND OF THE INVENTION

In the construction of smoke detectors operating on the reflected light principle, a housing forming a dark chamber is provided with an internal light beam, and a photo-cell views the light beam in a suitable manner to respond only to light reflected from smoke particles in the light beam. Many detectors provide apertures leading into the chamber to permit ambient atmosphere to diffuse into the chamber. Since the aperture must provide a circuitous route for the ambient air, to prevent entrance of ambient light, the time required for ambient smoke to diffuse into the housing and reach the concentration required to actuate the alarm is longer than desirable.

To reduce the time required to get ambient smoke into the housing, means have been provided to continuously force smoke through the housing. In most installations, for reasons of economy and because of restrictions on the amount of power allowed to be drawn by the detector, the only practical means of accomplishing this is by the use of a small heating resistor, which is positioned in the detector to cause air flow therethrough by a chimney effect. The light and photo-cell are then positioned to respectively illuminate and view the column of smoke containing air passing through the detector.

However, it has been found that the response time of such a detector is very little, if any, faster than that of a detector that depends on the diffusion of ambient air into the chamber. The reason for this is apparently the fact that, due to the low power that induces the air flow, the resulting flow is laminar, rather than turbulent. Hence smoke entrained in the incoming air tends to remain stratified in layers. The illumination of the layers of smoke does not produce appreciable reflected light onto the photocell until the smoke concentration in the ambient atmosphere becomes unduly high.

Another problem encountered in detectors of this type in which the photocell and the light source are positioned in recesses in a block of material, said recesses being inclined toward each other and opening to the surface of the block adjacent each other, is the fact that a build-up of dust and lint on the surface between the apertures can allow the light to travel along the surface into the photo-cell aperture causing a false alarm.

SUMMARY OF THE INVENTION

This invention provides a smoke detector of the above-described type in which ambient air is drawn into a detector by a heater to produce a chimney effect. The design of the housing provides a chamber with ports disposed on opposite sides thereof. Air drawn through the "chimney" by the heater pulls air through the chamber. The flow of air across the chamber from one port to the other creates air current eddies in the chamber alongside the direct path between the entrance and exit ports. When smoke is present in the incoming air, the eddies fill with smoke which becomes more uniformly dispersed in the space occupied by the eddies than it is in the air entering through the entrance port.

The chamber is illuminated by a suitable light source, and a photo-cell views the chamber, to respond to light reflected from illuminated smoke particles.

In a particular embodiment of the invention, the side wall of the housing containing the inlet port is provided with a recess on each side of the inlet port containing the light source and the photo-cell. The surface of the side wall between the photo-cell recess and the light source recess is therefore broken by the inlet port. Build-up of dust on a surface between the light and the photo-cell, which could cause a false alarm, is thereby prevented.

The above-described system has been found to provide, for a given concentration of smoke in the ambient atmosphere, an appreciably greater response than is obtained by illuminating and viewing the air in the entrance port.

DESCRIPTION OF THE ILLUSTRATED EMBODIMENT

Figure 1:
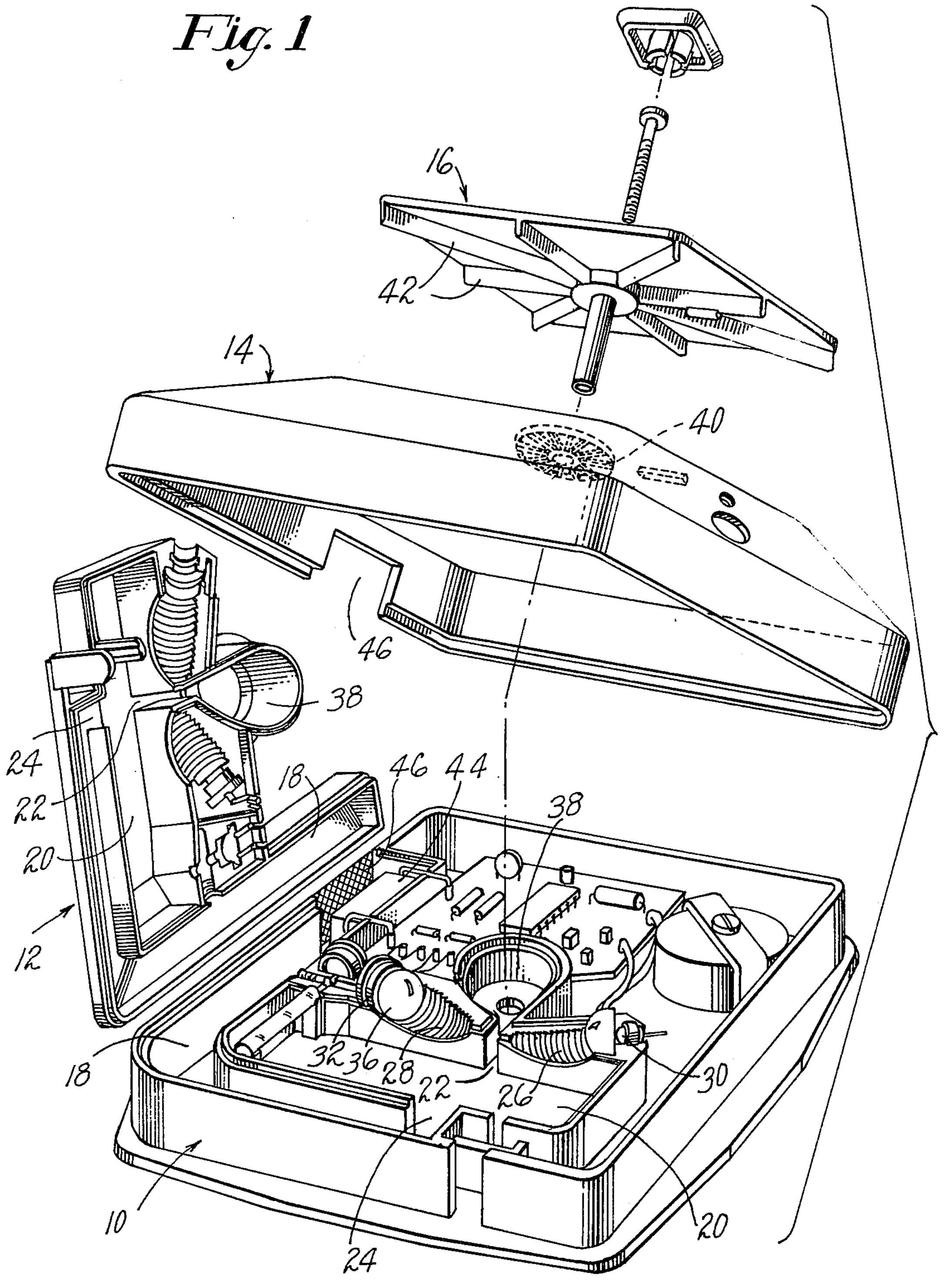
FIG. 1 is an exploded view of the components of the detector housing.
Figure 2:
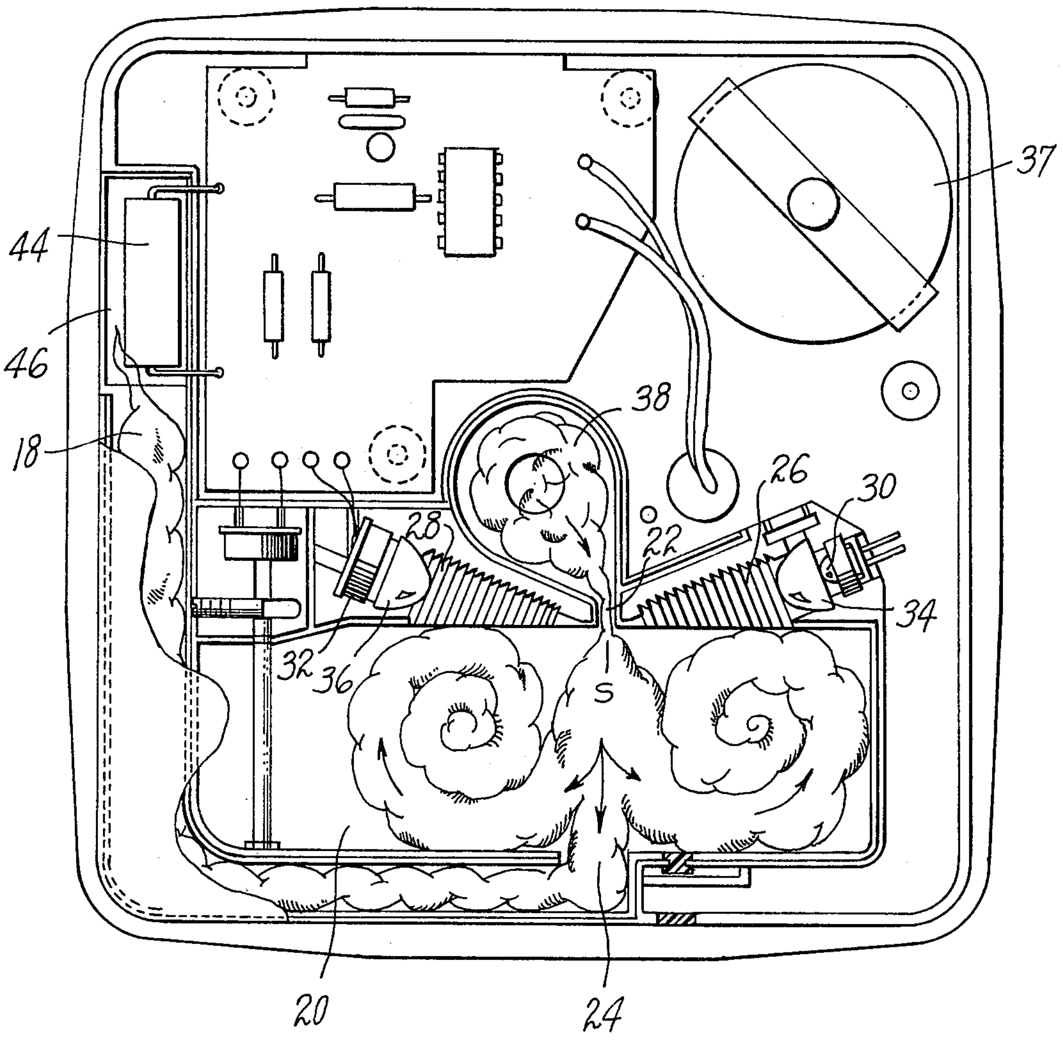
FIG. 2 is a plan view of the bottom portion of the detector housing, with certain components shown in the assembled position.
Figure 3:
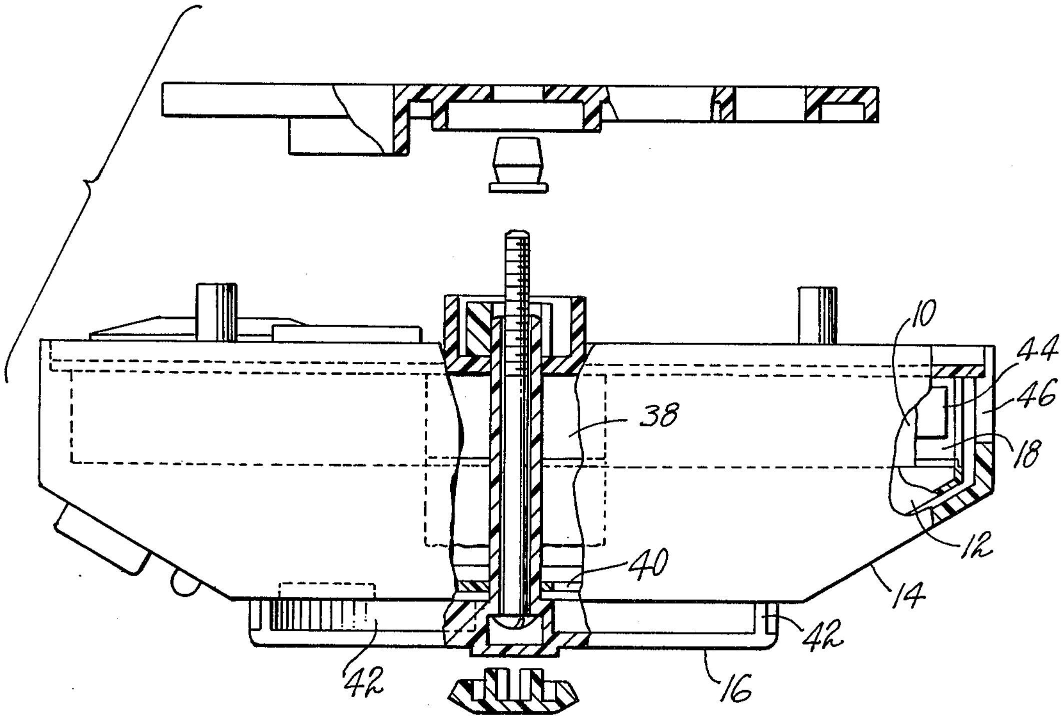
FIG. 3 is a view in elevation, partly in section of the cover portion of the detector.

Referring to the drawing there is illustrated a smoke detector which comprises a housing having a base portion 10, an upper portion 12, a cover 14, and an air-directing plate 16.

The base portion 10 and the upper portion 12 may conveniently be formed of molded plastic, and having mating internal portions, to be more fully described hereinafter, that form a smoke chimney 18, a smoke chamber 20 having an entrance port 22 and an exit port 24 disposed generally opposite each other, and recesses 26 and 28 for receiving, respectively, a light source 30 and a photo-cell 32 and associated focusing lenses 34 and 36.

The photo-cell is connected to suitable circuitry (not shown) to actuate an alarm 37 when an electrical characteristic of the photo-cell (such as resistance, in the case of a photo-resistive device) changes a predetermined amount. Such circuits are well known in the art.

The entrance port 22 is in the form of a narrow slot leading from an entrance chamber 38, the upper side of which is positioned below an opening 40 in the cover 14.

The air directing plate 16 is provided with radial vanes 42 which rest against the top of the cover 14 and direct air moving across the detector to the center of the plate, where it is drawn into the entrance chamber 38.

To create a continuous small flow of air through the detector, a heating resistor 44 is mounted in the chimney 18. The detector is intended for mounting on a wall with the chimney in the vertical position, or for mounting on a ceiling. When mounted on a wall, the heat from the resistor causes a flow of air up the chimney and out an exhaust vent 46, drawing air through the chamber 20 from the entrance chamber 38. When the detector is mounted on a ceiling, the fact that the resistor is higher than the opening 40 in the cover 14 causes a flow of air to occur through the detector when in this position.

If smoke is present in the incoming air, it appears in the air passing through the entrance slot 22; however, due to the laminar flow resulting from the low velocity of the air, it may not be uniformly distributed therein, and the dimensions of the air stream coming out of the slot are not great enough to cause an adequate photo-cell response unless the smoke concentration is much higher than the concentration at which it is desired that the alarm be actuated. However, as the air passes through the chamber, swirls or eddies form on both sides of air flowing across the chamber, due to the frictional effect of the air flowing across the chamber, due to the frictional effect of the air flow between the ports 20 and 22.

Hence if the incoming air contains smoke, smoke-filled eddies form on both sides of the direct path between the entrance and exit ports.

It is not clear whether the air flow in the eddies is turbulent or laminar; however, even if the flow is laminar the effect of the greater volume of smoke-filled air is to provide a greater surface from which light is reflected onto the photo-cell and therefore provides a greater photo-cell response, for a given concentration of smoke in the ambient air, than would be obtained from viewing only the air-smoke mixture passing through the entrance slot.

The light source 30 is positioned and directed to illuminate the chamber and the photo-cell is positioned and directed to view the illuminated chamber at an angle of about 135° to the axis of the light beam, to take advantage of the "forward scatter" effect.

The entrance port 22 preferably is narrower than its height, and has a cross-sectional area smaller than that of the exit port, or any other portion of the air flow passages, so that the velocity of flow into the chamber from the entrance port is higher than the velocity out of the chamber.

It is believed that maximum diffusion of the smoke-laden air throughout the chamber is thereby obtained.

The positioning of the slot 22 between the recess 28 containing the photo-cell and the recess 26 containing the light source presents the build-up of a continuous surface layer of dust or line therebetween, so that the possibility of a false alarm from such cause is eliminated.

Although in the illustrated embodiment the port between the recesses containing the photo-cell and the light source is the inlet port, it will be understood that in some cases the photo-cell and the light source can be positioned on opposite sides of the exit port.

In some installations more positive means of creating air flow through the chamber, such as a pump, may be used. In such case turbulent flow may exist in the entrance port, in which event the size of the chamber may be reduced.

Although the illustrated embodiment of the invention is designed for use with a gaseous medium, the principles of the invention may be adapted for use in deviced for measuring or detecting particles or turbidity in fluids.

Since certain other changes apparent to one skilled in the art can be made in the illustrated embodiment of the invention, it is intended that all matter contained herein be interpreted in an illustrative and not a limiting sense.

I claim:

1. A detector of particles in a fluid comprising a chamber, one wall of the chamber having recesses inclined toward each other and opening to the chamber in spaced relation, a light source in one recess for illuminating the chamber and a photo-cell in the other recess viewing the chamber, a separate fluid passage formed in the wall between the recesses and means for causing fluid to flow through said passage.

2. A smoke detector comprising a chamber, formed by end walls and side walls, one side wall having an exit aperture, the other side wall having an entrance aperture and recesses formed therein on opposite sides of one of the entrance apertures, the axis of said recesses being inclined toward each other and toward the chamber, a light source disposed in one recess, the light source and its associated recess being dimensioned and arranged to illuminate the chamber, a photo-responsive device disposed in the other recess, said photo-responsive device being positioned to view the chamber, and means causing ambient air to flow through the chamber by way of the entrance and exit apertures, said chamber being sufficiently large that eddies form on either side of a direct path between the entrance port and the exit port which fill with smoke when smoke is present in the ambient air, said eddies being illuminated by the light source and viewed by the photo-responsive device.

3. A smoke detector comprising a chamber formed by a peripheral wall, one wall portion having a pair of recesses inclined toward each other and opening to the chamber, one recess containing a light source which, when energized, projects a light into the chamber, the other recess containing a photo-responsive device viewing the chamber, a first air passage disposed between the recesses, and a second air passage disposed in a portion of the chamber wall spaced from the entrance port.

* * * * *